US010363931B2

(12) United States Patent
Tsuji et al.

(10) Patent No.: US 10,363,931 B2
(45) Date of Patent: Jul. 30, 2019

(54) VEHICLE CONTROL DEVICE, VEHICLE CONTROL METHOD AND VEHICLE CONTROL PROGRAM

(71) Applicant: HONDA MOTOR CO., LTD, Minato-ku, Tokyo (JP)

(72) Inventors: Kanta Tsuji, Utsunomiya (JP); Shinji Ijima, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/798,511

(22) Filed: Oct. 31, 2017

(65) Prior Publication Data

US 2018/0126988 A1    May 10, 2018

(30) Foreign Application Priority Data

Nov. 8, 2016  (JP) .................................. 2016-217904

(51) Int. Cl.
*B60W 30/16* (2012.01)
*B60W 30/14* (2006.01)

(52) U.S. Cl.
CPC .......... *B60W 30/16* (2013.01); *B60W 30/146* (2013.01); *B60W 2550/142* (2013.01); *B60W 2550/308* (2013.01)

(58) Field of Classification Search
CPC ....... B60T 7/12; B60W 30/16; B60W 30/146; B60W 2550/142; B60W 2550/308

(Continued)

(56) References Cited

U.S. PATENT DOCUMENTS

2005/0143895 A1* 6/2005 Kato .................. B60K 31/0008
                                                                  701/96
2010/0217469 A1* 8/2010 Bach ...................... B60T 7/122
                                                                  701/31.4

(Continued)

FOREIGN PATENT DOCUMENTS

JP    2000-052956    2/2000
JP    2009-505892    2/2009

(Continued)

OTHER PUBLICATIONS

Japanese Office Action for Japanese Patent Application No. 2016-217904 dated May 8, 2018.

*Primary Examiner* — Isaac G Smith
(74) *Attorney, Agent, or Firm* — Amin, Turocy & Watson LLP

(57) ABSTRACT

An object of the present invention is to provide a vehicle control device which is capable of preventing a vehicle from being excessively close to a preceding vehicle, a vehicle control method and a vehicle control program. The vehicle control device includes: recognizer configured to recognize peripheral conditions, a gradient traveling controller configured to control traveling of the vehicle, a following traveling controller configured to control the traveling of the vehicle to maintain a predetermined distance from a preceding vehicle, and a receiver configured to receive at least one instruction to switch an operation of the gradient traveling controller and the following traveling controller to an ON state, wherein the operation of the following traveling controller is prioritized when at least one instruction to set the operation of both the gradient traveling controller and the following traveling controller to the ON state.

7 Claims, 4 Drawing Sheets

(58) Field of Classification Search
USPC .................................................. 701/93, 94
See application file for complete search history.

(56) References Cited

U.S. PATENT DOCUMENTS

2015/0217768 A1* 8/2015 Fairgrieve ........... B60W 30/143
   701/93
2016/0332622 A1* 11/2016 Shiraishi .................. B60T 7/22

FOREIGN PATENT DOCUMENTS

| | | |
|---|---|---|
| JP | 2012-106735 | 6/2012 |
| JP | 2015-143970 | 8/2015 |
| JP | 2015-526637 | 9/2015 |
| WO | 2014027061 | 2/2014 |

* cited by examiner

VEHICLE CONTROL DEVICE, VEHICLE CONTROL METHOD AND VEHICLE CONTROL PROGRAM

CROSS-REFERENCE TO RELATED APPLICATION

Priority is claimed on Japanese Patent Application No. 2016-217904, filed Nov. 8, 2016, the content of which is incorporated herein by reference.

BACKGROUND

Field of the Invention

The present invention relates to a vehicle control device, a vehicle control method and a vehicle control program.

Description of Related Art

Recently, techniques for supporting driver's driving have been developed. For example, off-road speed control for controlling a vehicle to reduce an influence of wheel slip against acceleration of the vehicle, hill descent control (HDC) for suppressing an inertial speed of a vehicle at the time of down gradient, low speed following (LSF) control for automatically following a preceding vehicle in a low speed region, and so on, are known as techniques for supporting driving. In this regard, a technology in which HDC is prioritized over off-road speed control in a vehicle equipped with the off-road speed control and the HDC is disclosed (for example, Japanese Unexamined Patent Application, First Publication No. 2015-526637).

SUMMARY

However, the above-described Patent Document 1 does not disclose a vehicle equipped with LSF control and HDC. Therefore, in a vehicle equipped with LSF control and HDC, there is a possibility that the vehicle will be excessively close to a preceding vehicle.

The present invention has been made in view of such circumstances, and it is an object of the present invention to provide a vehicle control device which is capable of preventing an vehicle from being excessively close to a preceding vehicle, a vehicle control method and a vehicle control program.

A vehicle control device according to an aspect of the present invention includes: a peripheral condition recognizer configured to recognize peripheral conditions around a vehicle, a gradient traveling controller configured to control traveling of the vehicle and to thereby suppress an acceleration caused by a down gradient when the vehicle travels on the down gradient, a following traveling controller configured to control the traveling of the vehicle to maintain a predetermined distance from a receding vehicle recognized by the peripheral condition recognizer to the vehicle, and a receiver configured to receive at least one instruction to switch an operation of the gradient traveling controller and the following traveling controller to an ON state or an OFF state, wherein the operation of the following traveling controller is prioritized when at least one instruction to set the operation of both the gradient traveling controller and the following traveling controller to the ON state is received by the receiver.

In the vehicle control device described above, the following traveling controller is configured to control the traveling of the vehicle to be maintained at a predetermined speed when there is no preceding vehicle and is configured to prioritize the operation of the gradient traveling controller when there is no preceding vehicle.

In the vehicle control device described above, in a state in which there is a preceding vehicle, when a state in which a vehicle speed when the vehicle is following the preceding vehicle is equal to or less than an upper limit speed at which control by the gradient traveling controller is performed is changed to a state in which there is no preceding vehicle and then the instruction to set the operation of each of the gradient traveling controller and the following traveling controller to the ON state is received, the operation of the gradient traveling controller is prioritized.

In the vehicle control device described above, further comprising a control part configured to output information indicating that the operation of the following traveling controller is prioritized to an information output device when the operation of the following traveling controller is prioritized.

In the vehicle control device described above, the receiver is configured to receive one instruction to switch the operation of the gradient traveling controller and the operation of the following traveling controller to the ON state, and wherein the operation of the following traveling controller is prioritized when the instruction to set the operation of both the gradient traveling controller and the following traveling controller to the ON state is received by the receiver.

In the vehicle control device described above, the receiver is configured to receive a first instruction to switch the operation of the gradient traveling controller to the ON state and a second instruction to switch the operation of the following traveling controller to the ON state, and wherein the operation of the following traveling controller is prioritized when the first and the second instruction to set the operation of each of the gradient traveling controller and the following traveling controller to the ON state is received by the receiver.

A vehicle control device according to an aspect of the present invention includes: A vehicle control method wherein an in-vehicle computer receiving at least one instruction to switch an operation of a gradient traveling controller and a following traveling controller, performing the operation of the following traveling controller with priority when at least one instruction to set the operation of both the gradient traveling controller and the following traveling controller to the ON state is received by the received instruction, wherein the gradient traveling controller is configured to control traveling of the vehicle and to thereby suppress an acceleration caused by a down gradient when the vehicle travels on the down gradient, wherein the following traveling controller is configured to control the traveling of the vehicle to maintain a predetermined distance from a preceding vehicle, the preceding vehicle is recognized by a peripheral condition recognizer recognizing peripheral conditions around the vehicle.

A vehicle control device according to an aspect of the present invention includes: A non-transitory computer-readable storage medium that stores a vehicle control program to be executed by a computer to perform: receive at least one instruction to switch an operation of a gradient traveling controller and a following traveling controller, perform the operation of the following traveling controller with priority when at least one instruction to set the operation of both the gradient traveling controller and the following traveling controller to the ON state is received by the received instruction, wherein the gradient traveling controller is configured to control traveling of the vehicle and to thereby suppress an acceleration caused by a down gradient when the vehicle travels on the down gradient, wherein the following traveling controller is configured to control the traveling of the vehicle to maintain a predetermined distance from a preceding vehicle, the preceding vehicle is recognized by a peripheral condition recognizer recognizing peripheral conditions around the vehicle.

According to the invention disclosed in claim 1, 5 and 6, when an instruction to set both of the gradient traveling controller and the following traveling controller to the ON state while prioritizing the operation of the following traveling controller, it is possible to prevent the vehicle from being excessively close to the preceding vehicle.

According to the invention disclosed in claim 2 or 3, since the operation of the gradient traveling controller is prioritized when there is no preceding vehicle, the vehicle can travel in consideration of the down gradient.

According to the invention disclosed in claim 4, when the operation of the following traveling controller is prioritized, by outputting information indicating that the operation of the following traveling controller is prioritized, it is possible to notify a vehicle occupant of content of prioritizing control.

DETAILED DESCRIPTION OF EMBODIMENTS

Hereinafter, embodiments of a vehicle control device, a vehicle control method and a vehicle control program according to the present invention will be described below with reference to the drawings.

First Embodiment

Figure 1:
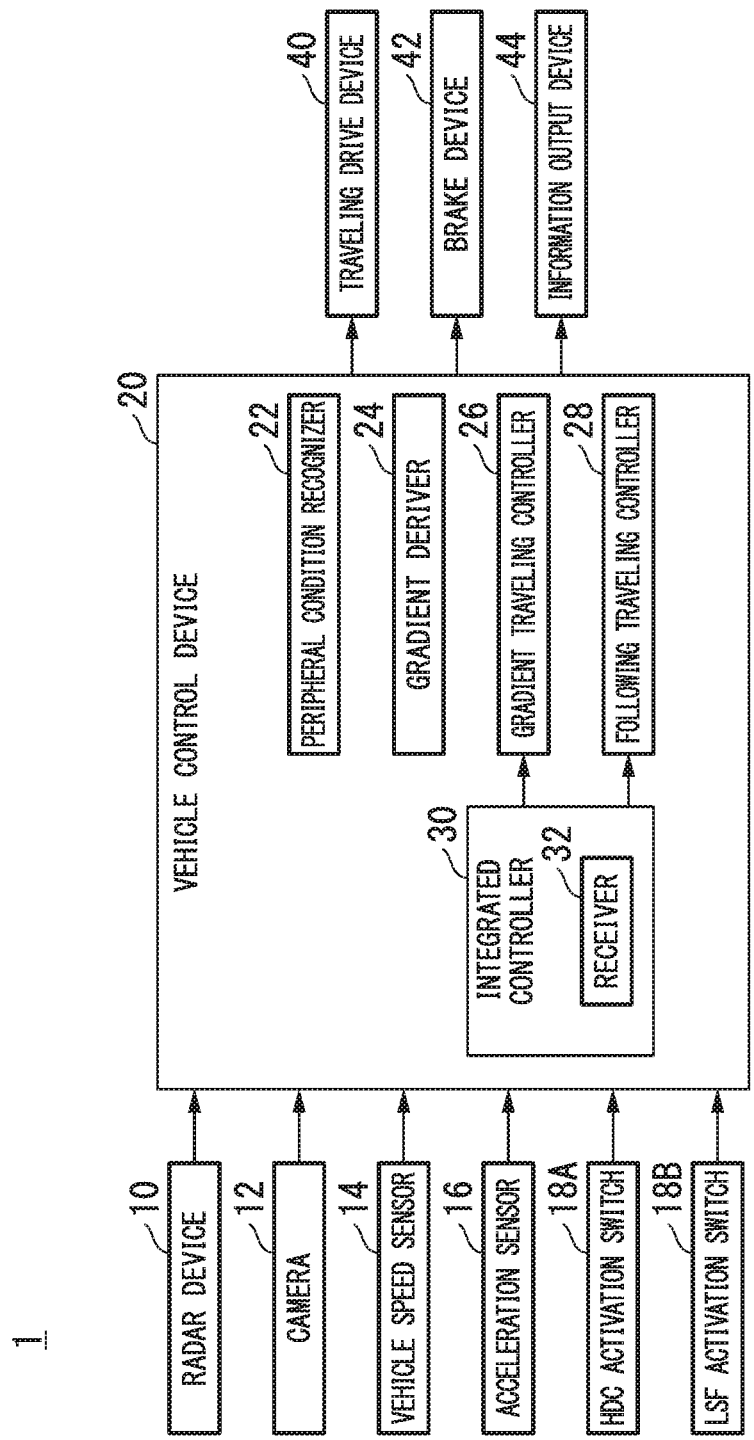
FIG. 1 is a diagram showing an example of a functional constitution of a vehicle control system.

FIG. 1 is a diagram showing an example of a functional constitution of a vehicle control system 1. For example, the vehicle control system 1 includes a radar device 10, a camera 12, a vehicle speed sensor 14, an acceleration sensor 16, an HDC activation switch 18A, an LSF activation switch 18B, a vehicle control device 20, a traveling drive device 40, a brake device 42, and an information output device 44.

The radar device 10 is provided near, for example, a bumper, a front grill, or the like of a vehicle (hereinafter referred to as the vehicle) in which the vehicle control system 1 is mounted. For example, the radar device 10 radiates millimeter waves forward from the vehicle and receives reflected waves generated by the millimeter waves colliding with and reflected by an object. Hereinafter, it is assumed that the object is a preceding vehicle. The preceding vehicle is a vehicle which is traveling in front of the vehicle in the same lane as the vehicle or a vehicle which is stopped immediately in front of the vehicle and is located within a predetermined distance from the vehicle. The radar device 10 specifies a position of the preceding vehicle by analyzing the received reflected waves. The position of the preceding vehicle includes, for example, at least a distance from the vehicle to the preceding vehicle and may also include an azimuth, a lateral position or the like of the preceding vehicle with respect to the vehicle. The radar device 10 detects the position of the preceding vehicle using, for example, a frequency-modulated continuous wave (FM-CW) method and outputs a detection result to the vehicle control device 20.

The camera 12 is a digital camera using a solid-state imaging device such as a charge couple device (CCD) or a complementary metal oxide semiconductor (CMOS). The camera 12 is installed at an upper portion of a front windshield, a rear surface of a rearview mirror, or the like. For example, the camera 12 periodically repeats imaging of the area in front of the vehicle. The camera 12 outputs a captured image to the vehicle control device 20. The number of the cameras 12 is not limited to one, and a plurality of cameras 12 may be provided in the vehicle, or a stereo camera including a plurality of cameras may be used.

The vehicle speed sensor 14 includes wheel speed sensors installed at wheels of the vehicle that detect a rotation speeds of the wheels, and a controller which integrates detection values detected by the wheel speed sensors and generates a vehicle speed signal. The vehicle speed sensor 14 detects a traveling speed of the vehicle and outputs a vehicle speed signal indicating the detected traveling speed to the vehicle control device 20.

The acceleration sensor 16 is, for example, a triaxial acceleration sensor. The acceleration sensor 16 outputs a detected acceleration to the vehicle control device 20. Further, the acceleration sensor 16 may be a biaxial acceleration sensor.

The HDC activation switch 18A is, for example, a dedicated mechanical switch provided near a driver's seat. Further, the HDC activation switch 18A may be a graphical user interface (GUI) switch or the like. The HDC activation switch 18A receives an instruction from a vehicle occupant to set HDC to an ON state or an OFF state and outputs information indicating the received instruction to the vehicle control device 20. For example, when the instruction to set the HDC to the ON state is received, the HDC control activation switch 18A outputs an HDC-ON signal for turning on the HDC to the vehicle control device 20.

The LSF activation switch 18B is, for example, a dedicated mechanical switch provided near the driver's seat. Further, the LSF activation switch 18B may be a GUI switch or the like. The LSF activation switch 18B receives an instruction from a vehicle occupant to set LSF control to an ON state or an OFF state and outputs information indicating the received instruction to the vehicle control device 20. For example, when the instruction to set the LSF control to the ON state is received, the LSF activation switch 18B outputs an LSF-ON signal for turning on the LSF control to the vehicle control device 20.

The vehicle control device 20 includes, for example, a peripheral condition recognizer 22, a gradient deriver 24, a gradient traveling controller 26, a following traveling controller 28 and an integrated controller 30. Some or all of the peripheral condition recognizer 22, the gradient deriver 24, the gradient traveling controller 26, the following traveling controller 28 and the integrated controller 30 are realized by a processor executing a program (software) on hardware such as a central processing unit (CPU). Further, some or all may be realized by hardware (a circuit unit; including circuitry) such as a large scale integration (LSI), an application specific integrated circuit (ASIC), a field-programmable gate array (FPGA) or a graphics processing unit (GPU) and may also be realized by a combination of software and hardware. Further, the functional units included in the vehicle control device 20 may be distributed among a plurality of computer devices. In addition, a program executed by a processor included in the vehicle control system 1 may be stored in advance in a memory device provided in the vehicle control device 20 or may be downloaded from an external device through an in-vehicle Internet facility or the like.

The peripheral condition recognizer 22 acquires the detection result of the radar device 10 and recognizes the position, the speed and the like of the preceding vehicle on the basis of the acquired result. Also, the peripheral condition recognizer 22 may acquire the image captured by the camera 12 and may recognize the position, the speed and the like of the preceding vehicle by analyzing the acquired image. Further, the peripheral condition recognizer 22 tends to emphasize the distance from the vehicle in the positions of the preceding vehicles which are specified by the radar device 10, tends to emphasize the azimuth or the lateral position in the positions specified by analyzing the image captured by the camera 12 and thus may recognize the position of the object by integrating the positions.

Further, instead of (or in addition to) the radar device 10, a sensor such as a laser radar and an ultrasonic sensor may be provided. Also, the peripheral condition recognizer 22 may detect the position, the speed and the like of the preceding vehicle on the basis of inter-vehicle communication or information acquired from a sensor which detects the vehicle traveling on a road. In this case, the vehicle includes a communicator which communicates with the sensor or the like which detects other vehicles or vehicles traveling on the road.

The gradient deriver 24 derives a gradient of a place at which the vehicle is located. For example, the gradient deriver 24 derives a gradient of a road surface on the basis of an acceleration in a stationary state which is obtained by subtracting an acceleration in a traveling direction obtained by differentiating a vehicle speed detected by the vehicle speed sensor 14 from an acceleration output by the acceleration sensor 16.

The gradient traveling controller 26 controls traveling of the vehicle and thereby suppresses the acceleration caused by a down gradient when the vehicle travels on the down gradient. Hereinafter, such control is referred to as hill descent control (HDC). The HDC is control by which a vehicle speed in the case in which a driver does not operate an accelerator pedal and a brake pedal is maintained without a driver operating an accelerator pedal or a brake pedal by controlling the brake device 42 when the vehicle travels on the down gradient. For example, a vehicle speed in the case in which the vehicle is controlled by the gradient traveling controller 26 is changed by the accelerator pedal or the brake pedal operated by the driver. For example, when the driver increases the vehicle speed by operating the accelerator pedal and then stops the operating of the accelerator pedal, the vehicle travels constantly at a vehicle speed at that point.

The following traveling controller 28 controls the traveling of the vehicle to maintain at least a predetermined distance (an inter-vehicle distance) from the preceding vehicle recognized by the peripheral condition recognizer 22 to the vehicle. Hereinafter, such control is referred to as low speed following (LSF) control. The LSF control is control by which the vehicle travels while keeping a distance between the vehicle and the preceding vehicle constant and the vehicle is automatically stopped without depending on an operation of the driver when the preceding vehicle is in a low-speed traveling state or in a stopped state. The following traveling controller 28 controls one or both of the traveling drive device 40 and the brake device 42 on the basis of the recognition result of the peripheral condition recognizer 22.

The integrated controller 30 includes a receiver 32. The receiver 32 receives the instruction to switch each of the gradient traveling controller 26 and the following traveling controller 28 to the ON state or the OFF state. The receiver 32 acquires a signal input from at least one of the HDC activation switch 18A and the LSF activation switch 18B and thus receives an instruction corresponding to an input operation performed by the driver. The "receiver" in the claims may refer to the receiver 32 or may refer to the HDC activation switch 18A and the LSF activation switch 18B.

When the HDC-ON signal is input to the receiver 32 but the LSF-ON signal is not input, the integrated controller 30 turns on the HDC. When the LSF-ON signal is input to the receiver 32 but the HDC-ON signal is not input, the integrated controller 30 turns on the LSF control. When both of the HDC-ON signal and the LSF-ON signal are input to the receiver 32, the integrated controller 30 turns on the LSF control and turns off the HDC.

For example, the traveling drive device 40 is a drive source such as an engine or a traveling motor. The traveling drive device 40 outputs a torque for allowing the vehicle to travel to the drive wheels according to a control amount output by the vehicle control device 20.

The brake device 42 includes, for example, an electric motor. For example, the electric motor outputs a brake torque corresponding to a braking operation to each of the wheels according to the control amount output by the vehicle control device 20.

The information output device 44 is a display, a speaker, or the like provided at a position which is visible to the vehicle occupant. The display displays information in the form of an image. For example, the display includes a liquid crystal display (LCD), an organic electroluminescence (EL) display device, and so on. The speaker outputs the information in the form of a voice.

Figure 2:
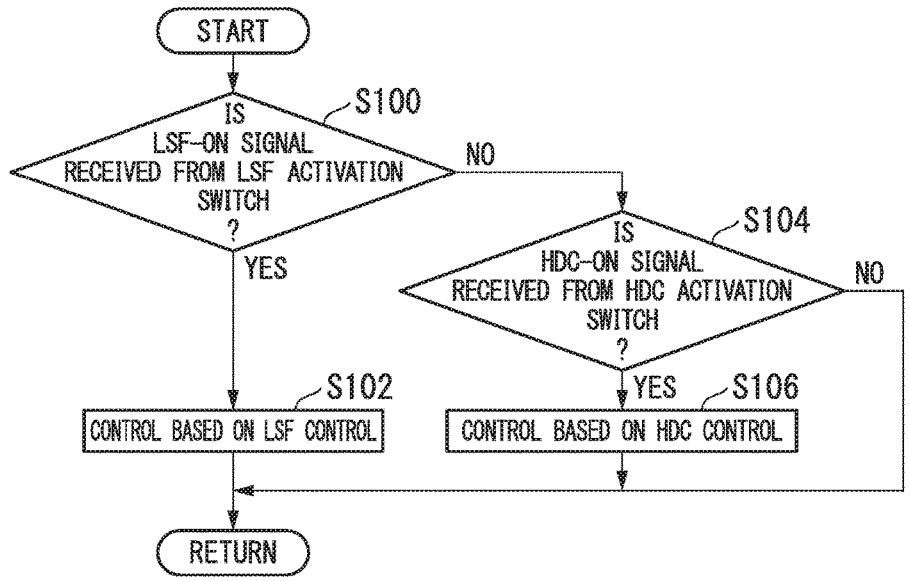
FIG. 2 is a flowchart showing a flow of processing performed by an integrated controller.

FIG. 2 is a flowchart showing a flow of processing performed by the integrated controller 30. For example, the processing in the flowchart is repeatedly performed at a predetermined cycle. First, the integrated controller 30 determines whether the LSF-ON signal is received from the LSF activation switch 18B (Step S100).

When the LSF-ON signal is received from the LSF activation switch 18B, the integrated controller 30 turns on the LSF control and controls the traveling drive device 40 or the brake device 42 on the basis of the LSF control (Step S102). When the LSF-ON signal is not received from the LSF activation switch 18B, the integrated controller 30 determines whether the HDC-ON signal is received from the HDC activation switch 18A (Step S104).

When the HDC-ON signal is received from the HDC activation switch 18A, the integrated controller 30 turns on the HDC and controls the brake device 42 on the basis of the HDC (Step S106). When the HDC-ON signal is not received from the HDC activation switch 18A, the vehicle is controlled on the basis of an operation performed by the vehicle occupant on the accelerator pedal, the brake pedal, or the like. The processing of one routine of the flowchart is thereby finished.

Further, for example, when the HDC is not performed because the LSF control is prioritized even though the HDC-ON signal is received from the HDC activation switch 18A, the integrated controller 30 may cause the information output device 44 to output information indicating an effect (that the HDC is not performed because the LSF control is prioritized).

Here, for example, a case in which the HDC is prioritized over the LSF control is considered. In this case, since the HDC is control in which the preceding vehicle is not considered, the vehicle does not decelerate even as it approaches the preceding vehicle, and there may be a case in which the vehicle approaches the preceding vehicle excessively.

In this regard, the vehicle control system 1 of the embodiment prioritizes the LSF control over the HDC. In this case, since the LSF control is control in which the preceding vehicle is considered and the vehicle travels behind the preceding vehicle, the vehicle travels while maintaining a predetermined distance from the preceding vehicle. Accordingly, the vehicle can be prevented from excessively approaching the preceding vehicle, or the vehicle can be prevented from approaching excessively with the preceding vehicle. As a matter of course, if the preceding vehicle is located on the down gradient, it is supposed that the preceding vehicle travels in consideration of this, and thus the vehicle can practically travel in consideration of the down gradient by following the preceding vehicle.

According to the above-described vehicle control system 1 according to the embodiment, when the instruction to set both of the gradient traveling controller 26 and the following traveling controller 28 to the ON state is received, the vehicle can be prevented from approaching the preceding vehicle excessively by prioritizing an operation of the following traveling controller 28.

Also, in the above-described embodiment, a case in which the integrated controller 30 sets one of the LSF control and the HDC to the ON state on the basis of the acquired ON signal has been described. However, for example, the gradient traveling controller 26 and the following traveling controller 28 may always be kept in the ON state, and the integrated controller 30 may selectively output a control instruction output from either the gradient traveling controller 26 or the following traveling controller 28 to at least one of the traveling drive device 40 and the brake device 42 on the basis of the acquired ON signal.

In addition, for example, instead of (or in addition to) the HDC activation switch 18A and the LSF activation switch 18B, an integrated switch in which these switches are integrated may be provided in the vehicle control system 1. For example, the integrated switch may be a dedicated mechanical switch or a GUI switch provided near the driver's seat. The integrated switch receives an instruction on whether the LSF control and the HDC are turned on or off from the vehicle occupant and outputs information indicating the received instruction to the vehicle control device 20. That is, the integrated switch outputs the LSF-ON signal and the HDC-ON signal (or one instruction to switch an operation of the gradient traveling controller and the following traveling controller to an ON state) to the vehicle control device 20 upon receiving an instruction to set the LSF control and the HDC to the ON state from the vehicle occupant.

Further, in the above-described embodiment, the case in which the integrated controller 30 monitors an input of the LSF-ON signal and turns on one of the LSF control and the HDC has been described. However, for example, the gradient traveling controller 26 may monitor the input of the LSF-ON signal and may stop the operation spontaneously when the LSF-ON signal is input. Also, the gradient traveling controller 26 may monitor an operation state of the following traveling controller 28 and may stop the operation spontaneously at the timing at which the following traveling controller 28 starts the LSF control.

Second Embodiment

Hereinafter, a second embodiment will be described. In the first embodiment, the LSF control was prioritized regardless of presence of the preceding vehicle. In this regard, in the second embodiment, when there is no preceding vehicle, the integrated controller 30 prioritizes the control of the gradient traveling controller 26. Here, differences from the first embodiment will be mainly described, and description of functions or the like in common with those in the first embodiment will be omitted.

When there is not a preceding vehicle, the following traveling controller 28 of the second embodiment controls traveling of the vehicle to maintain a predetermined speed. The following traveling controller 28 outputs a control amount for maintaining the predetermined speed to the traveling drive device 40 or the brake device 42.

When there is a preceding vehicle, the integrated controller 30 prioritizes the LSF control as in the first embodiment. In this regard, when there is no preceding vehicle, the integrated controller 30 prioritizes the HDC.

Figure 3:
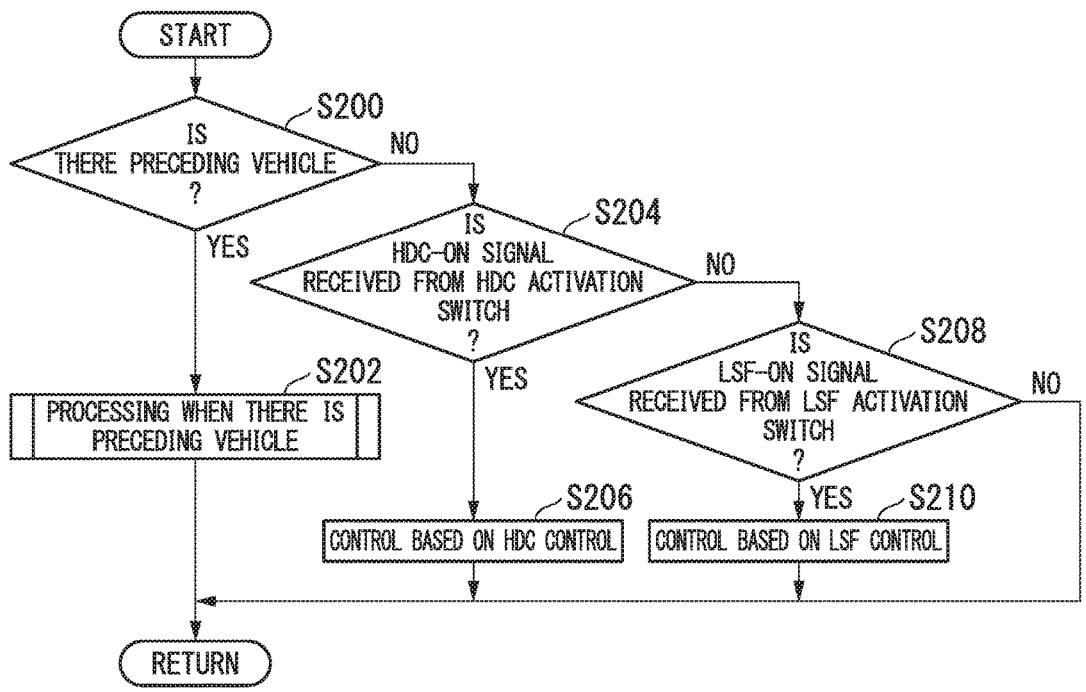
FIG. 3 is a flowchart showing a flow of processing performed by an integrated controller according to a second embodiment.

FIG. 3 is a flowchart showing a flow of processing performed by the integrated controller 30 according to the second embodiment. For example, the processing in the flowchart is repeatedly performed at a predetermined cycle. First, the integrated controller 30 determines whether there is a preceding vehicle (Step S200). When there is a preceding vehicle, the integrated controller 30 performs processing (processing from Step S100 to Step S106 in the flowchart of FIG. 2) in the case in which there is a preceding vehicle (Step S202).

When there is no preceding vehicle, the integrated controller 30 determines whether the HDC-ON signal is received from the HDC activation switch 18A (Step S204). When the HDC-ON signal is received from the HDC activation switch 18A, the integrated controller 30 turns on the HDC and controls the brake device 42 on the basis of the HDC (Step S206). When the HDC-ON signal is not received from the HDC activation switch 18A, the integrated controller 30 determines whether the LSF-ON signal is received from the LSF activation switch 18B (Step S208). When the LSF-ON signal is received from the LSF activation switch 18B, the integrated controller 30 turns on the LSF control and controls the traveling drive device 40 or the brake device 42 on the basis of the LSF control so that the vehicle travels at a predetermined speed (Step S210). When the LSF-ON signal is not received from the LSF activation switch 18B, the vehicle is controlled on the basis of an operation performed by the vehicle occupant on the accelerator pedal, the brake pedal, or the like. The processing of one routine of this flowchart is thereby finished.

The vehicle control system 1 of the embodiment prioritizes the LSF control over the HDC when there is a preceding vehicle and prioritizes the HDC over the LSF control when there is no preceding vehicle. Thus, when there is no preceding vehicle, the vehicle controls the traveling of the vehicle and thereby suppresses the acceleration caused by the down gradient. As a result, the vehicle control system 1 can travel in consideration of the down gradient.

According to the vehicle control system 1 of the above-described second embodiment, when there is no preceding vehicle, by prioritizing the operation of the gradient traveling controller 26, the traveling can be performed in consideration of the down gradient.

Modified Example of Second Embodiment

Hereinafter, a modified example of the second embodiment will be described. In the second embodiment, when there was no preceding vehicle, the integrated controller 30 prioritized the HDC regardless of the speed of the vehicle. In this regard, in the case in which there is no preceding vehicle and the integrated controller 30 prioritizes the HDC when the speed of the vehicle is equal to or lower than an upper limit speed of the HDC, the HDC is prioritized. Here, differences from the second embodiment will be mainly described, and description of functions and the like in common with those in the second embodiment will be omitted.

As a premise of the modified example of the second embodiment, the HDC is performed at the upper limit speed V1 or less. In the second embodiment, in the case in which the instruction to set both of the LSF control and the HDC to the ON state is received, there is a case in which the LSF control is switched to the HDC when the preceding vehicle is no longer present. However, under the above-described premise, when the preceding vehicle is no longer present in a state in which the speed of the vehicle exceeds the upper limit speed V1 of the HDC, the HDC cannot be performed in the first place. Therefore, in the modified example of the second embodiment, in the case in which the instruction to set both of the LSF control and the HDC to the ON state is received and the preceding vehicle is no longer present, the HDC is not prioritized and the LSF control is performed when the speed of the vehicle exceeds the upper limit speed V1. In other words, in the case in which the instruction to set both of the LSF control and the HDC to the ON state is received and the preceding vehicle is no longer present, the integrated controller 30 prioritizes the HDC when the speed of the vehicle at that point is less than or equal to the upper limit speed V1. Accordingly, it is possible to prevent occurrence of hunting or the like in control by preventing switching to the HDC at a speed at which the HDC cannot be carried out in the first place.

Figure 4:
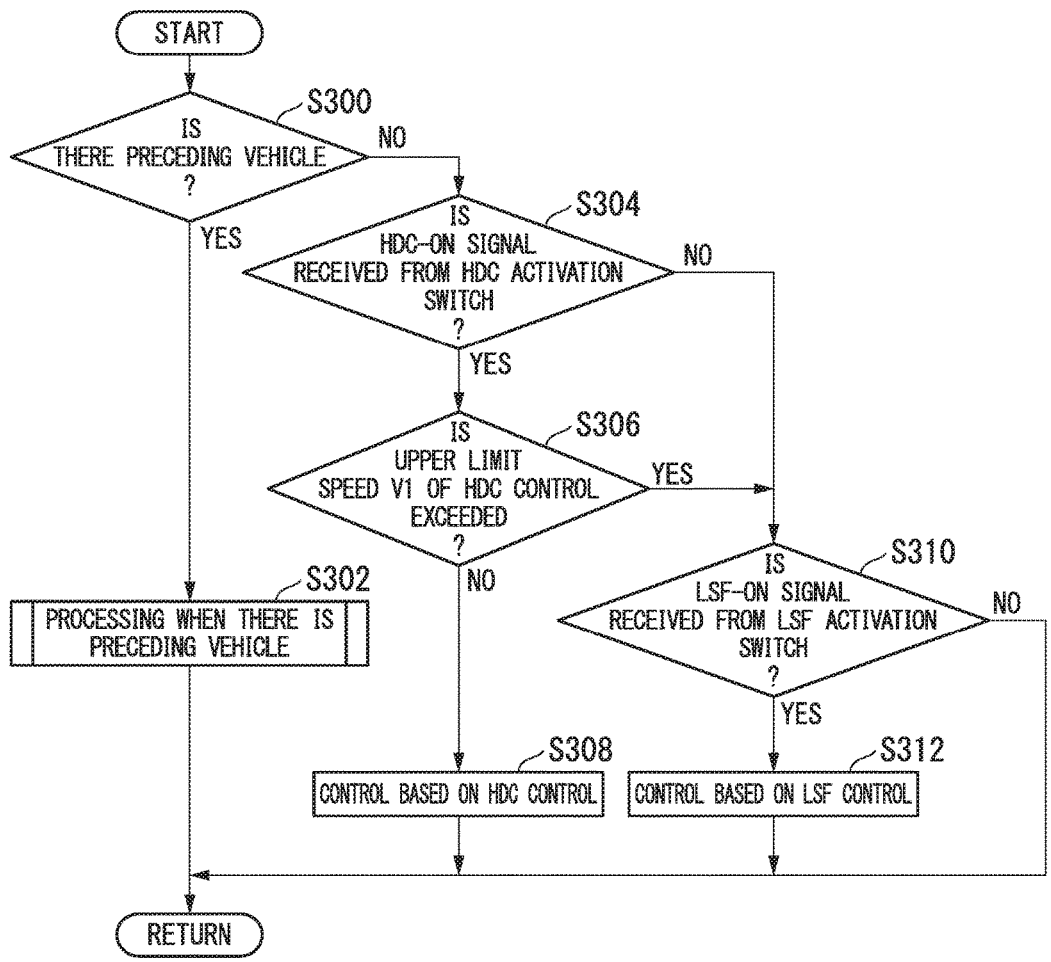
FIG. 4 is a flowchart showing a flow of processing performed by a vehicle control device in a modified example of the second embodiment.

FIG. 4 is a flowchart showing a flow of processing performed by the vehicle control device 20 in the modified example of the second embodiment. First, the integrated controller 30 determines whether there is a preceding vehicle (Step S300). When there is a preceding vehicle, the integrated controller 30 performs the processing (processing from Step S100 to Step S106 in the flowchart of FIG. 2) in the case in which there is a preceding vehicle (Step S302).

When there is no preceding vehicle, the integrated controller 30 determines whether the HDC-ON signal is received from the HDC activation switch 18A (Step S304). When the HDC-ON signal is not received from the HDC activation switch 18A, the processing proceeds to an operation of Step S310. When the HDC-ON signal is received from the HDC activation switch 18A, the integrated controller 30 determines whether the speed of the vehicle exceeds the upper limit speed V1 of the HDC (Step S306). When the speed of the vehicle is equal to or lower than the upper limit speed V1 of the HDC, the integrated controller 30 turns on the HDC and controls the brake device 42 on the basis of the HDC (Step S308).

When the speed of the vehicle exceeds the upper limit speed V1 of the HDC, the integrated controller 30 determines whether the LSF-ON signal is received from the LSF activation switch 18B (Step S310). When the LSF-ON signal is received from the LSF activation switch 18B, the integrated controller 30 turns on the LSF control and controls the traveling drive device 40 or the brake device 42 on the basis of the LSF control so that the vehicle travels at a predetermined speed exceeding the upper limit speed V1 (Step S312). When the LSF-ON signal is not received from the LSF activation switch 18B, the vehicle is controlled on the basis of the operation performed by the vehicle occupant on the accelerator pedal, the brake pedal, or the like. The processing of one routine of the flowchart is thereby finished.

According to the vehicle control system 1 according to the above-described modified example of the second embodiment, when the speed of the vehicle is equal to or lower than the upper limit speed of the HDC, it is possible to prevent switching to the HDC at a speed at which the HDC cannot be carried out in the first place by prioritizing the HDC and thus to prevent occurrence of hunting or the like in control.

Third Embodiment

Hereinafter, a third embodiment will be described. In the first embodiment, the case in which the vehicle control device 20 which performs the LSF control and the HDC is mounted in the vehicle and supports the driving of the driver has been described. In this regard, a vehicle control system 1A according to the third embodiment is equipped with an automatic driving control device 50, and the vehicle control system 1A performs automatic driving in which at least one of speed control and steering control of the vehicle is automatically performed. Here, differences from the first embodiment will be mainly described, and description of functions or the like in common with those in the first embodiment will be omitted.

Figure 5:
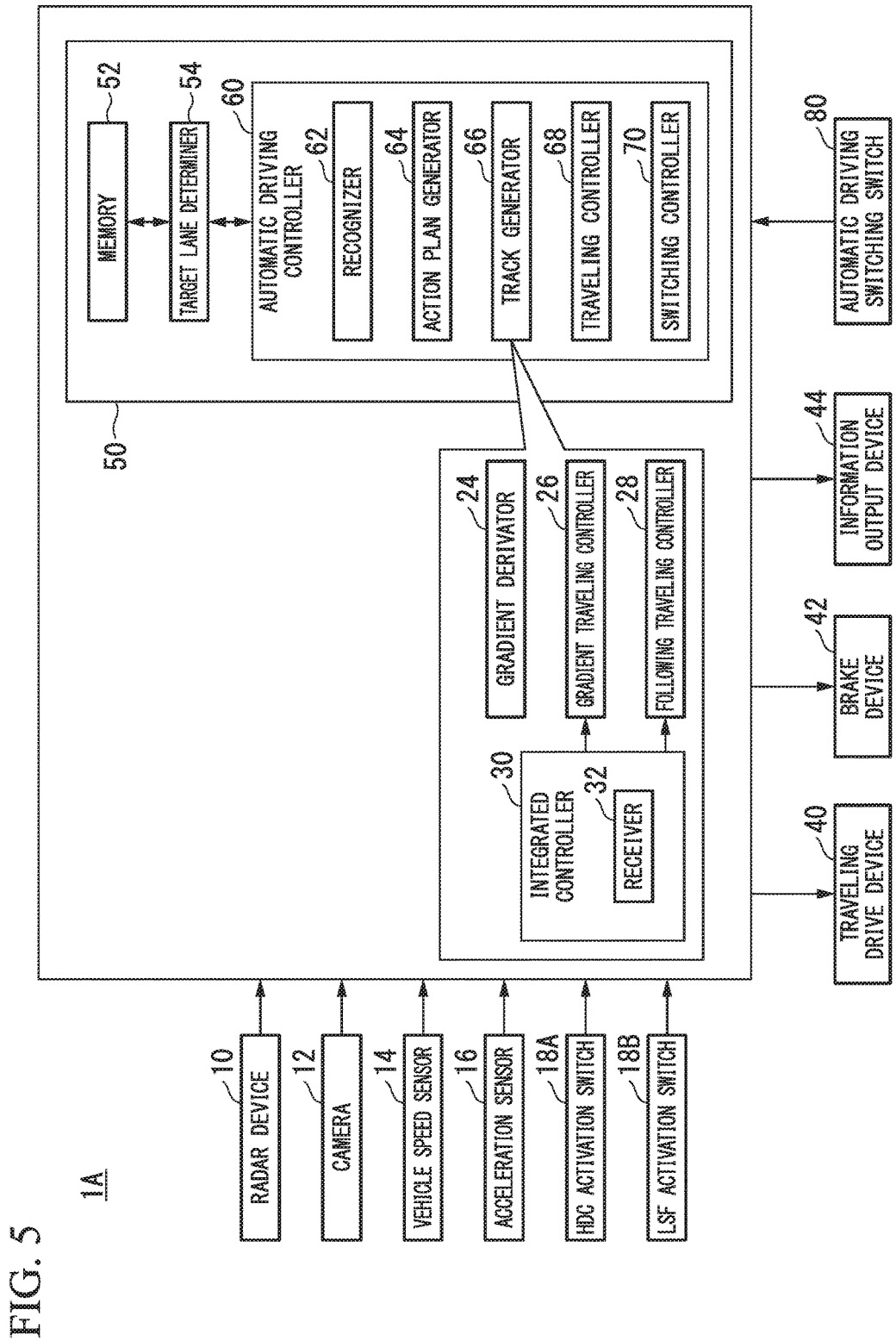
FIG. 5 is a diagram showing an example of a functional configuration of a vehicle control system according to a third embodiment.

FIG. 5 is a diagram showing an example of a functional configuration of the vehicle control system 1A according to the third embodiment. In addition to the radar device 10, the camera 12, the vehicle speed sensor 14, the acceleration sensor 16, the HDC activation switch 18A, the LSF activation switch 18B, the traveling drive device 40, the brake device 42, and the information output device 44, the vehicle control system 1A further includes an automatic driving control device 50 and an automatic driving switching switch 80. The automatic driving control device 50 includes, for example, a memory 52, a target lane determiner 54, and an automatic driving controller 60. For example, the memory 52 stores information such as high precision map information, target lane information, action plan information, and so on. The memory 52 is realized by a read only memory (ROM), a random access memory (RAM), a hard disk drive (HDD), a flash memory, or the like. A program executed by a processor included in the vehicle control system 1A may be stored in advance in the memory 52 or may be downloaded from an external device through an in-vehicle Internet facility or the like.

The target lane determiner 54 is realized by, for example, a micro-processing unit (MPU) or the like. The target lane determiner 54 divides a route provided from a navigation device into a plurality of blocks (for example, divides it every 100 [m] in a traveling direction of the vehicle) and determines a target lane for each block with reference to the high precision map information. The target lane determiner 54 determines, for example, in which lane from the left the vehicle travels. For example, the target lane determiner 54 determines a target lane so that the vehicle can travel along a reasonable traveling route for traveling to a branch destination when there is a branch point or a merge point in the route. The target lane determined by the target lane determiner 54 is stored in the memory 52 as the target lane information.

The automatic driving controller 60 includes, for example, a recognizer 62, an action plan generator 64, a track generator 66, a traveling controller 68, and a switching controller 70.

The recognizer 62 recognizes a relative position of the vehicle with respect to a traveling lane and provides the recognized relative position to the target lane determiner 54. Further, the recognizer 62 recognizes the position, the speed, the acceleration and so on of nearby vehicles located near the vehicle on the basis of information input from the radar device 10 and the camera 12.

The action plan generator 64 sets a starting point of automatic driving and/or a destination of automatic driving. The action plan generator 64 generates an action plan in a section between the starting point and the destination of the automatic driving. For example, the action plan is composed of a plurality of events which will be performed sequentially. The events include, for example, a deceleration event in which the vehicle decelerates, an acceleration event in which the vehicle accelerates, a lane maintain event in which the vehicle is driven without deviating from a traveling lane, a lane change event in which the traveling lane is changed, and an event of following the preceding vehicle. Information indicating the action plan generated by the action plan generator 64 is stored in the memory 52 as action plan information.

The track generator 66 determines one of traveling modes such as constant speed traveling, following traveling, low speed following traveling, decelerating traveling, curving traveling, obstacle avoiding traveling, lane changing traveling, merging traveling, and branching traveling and generates a candidate for a track on the basis of the determined traveling mode. The track generator 66 generates a track as a collection of target positions (track points) for a reference position (for example, a center of gravity and a center of a rear wheel shaft) of the vehicle to reach every predetermined time in the future. The track generator 66 includes the same functions as those of the vehicle control device 20 of the first or second embodiment. That is, when it is recognized by the recognizer 62 that a downhill road is present, the receiver 32 considers an instruction that the LSF control and the HDC are in the ON state to have been received. Additionally, the track generator 66 switches and performs the HDC and the LSF control by a function of the integrated controller 30 as one function of track generation. In this case, since the recognizer 62 is present, the peripheral condition recognizer 22 may be omitted.

The traveling controller 68 controls the traveling drive device 40 or the brake device 42 so that the vehicle passes through the track generated by the track generator 66 at a scheduled time. The switching controller 70 switches between an automatic driving mode and a manual driving mode on the basis of a signal input from the automatic driving switching switch 80.

According to the vehicle control system 1A of the above-described third embodiment, the effect of the first embodiment is exhibited, and when an automatic driving mode is set, the vehicle travels autonomously, and thus user convenience is further improved.

Although examples for carrying out the present invention have been described using the embodiments, the present invention is not limited to these embodiments at all, and various modifications and substitutions can be made within the scope not deviating from the gist of the present invention.

What is claimed is:

1. A vehicle control device comprising:
   a peripheral condition recognizer configured to recognize peripheral conditions around a vehicle,
   a gradient traveling controller configured to control traveling of the vehicle and to thereby suppress an acceleration caused by a down gradient when the vehicle travels on the down gradient,
   a following traveling controller configured to control the traveling of the vehicle to maintain a predetermined distance from a preceding vehicle recognized by the peripheral condition recognizer to the vehicle, and
   a receiver configured to receive at least one instruction to switch an operation of the gradient traveling controller and the following traveling controller to an ON state or an OFF state,
   wherein the operation of the following traveling controller is performed with a higher priority than the gradient travelling controller, regardless of whether any preceding vehicle is present in front of the vehicle, in a case where at least one instruction to set the operation of both the gradient traveling controller and the following traveling controller to the ON state is received by the receiver, and the vehicle travels on the down gradient.

2. The vehicle control device according to claim 1, wherein the following traveling controller is configured to control the traveling of the vehicle to be maintained at a predetermined speed when there is no preceding vehicle.

3. The vehicle control device according to claim 1, further comprising a control part configured to output information indicating that the operation of the following traveling controller is prioritized to an information output device when the operation of the following traveling controller is prioritized.

4. The vehicle control device according to claim 1,
   wherein the receiver is configured to receive one instruction to switch the operation of the gradient traveling controller and the operation of the following traveling controller to the ON state, and
   wherein the operation of the following traveling controller is prioritized when the instruction to set the operation of both the gradient traveling controller and the following traveling controller to the ON state is received by the receiver.

5. The vehicle control device according to claim 1,
   wherein the receiver is configured to receive a first instruction to switch the operation of the gradient traveling controller to the ON state and a second instruction to switch the operation of the following traveling controller to the ON state, and
   wherein the operation of the following traveling controller is prioritized when the first and the second instruction to set the operation of each of the gradient traveling controller and the following traveling controller to the ON state is received by the receiver.

6. A vehicle control device comprising:
   a peripheral condition recognizer configured to recognize peripheral conditions around a vehicle;
   a gradient traveling controller configured to control traveling of the vehicle and to thereby suppress an acceleration caused by a down gradient when the vehicle travels on the down gradient;
a following traveling controller configured to control the traveling of the vehicle to maintain a predetermined distance from a preceding vehicle recognized by the peripheral condition recognizer to the vehicle; and
a receiver configured to receive at least one instruction to switch an operation of the gradient traveling controller and the following traveling controller to an ON state or an OFF state,
wherein the operation of the following traveling controller is performed with a higher priority, in a case where at least one instruction to set the operation of both the gradient traveling controller and the following traveling controller to the ON state is received by the receiver, and the vehicle travels on the down gradient with a preceding vehicle present in front of the vehicle,
wherein the operation of the gradient traveling controller is performed with a higher priority, in a case where at least one instruction to set the operation of both the gradient traveling controller and the following traveling controller to the ON state is received by the receiver, and the vehicle travels on the down gradient, without any preceding vehicle present in front of the vehicle, at a vehicle speed equal to or less than an upper limit, the upper limit being a speed the gradient traveling controller starts to perform control,
wherein the operation of the following traveling controller is performed with a higher priority, in a case where at least one instruction to set the operation of both the gradient traveling controller and the following traveling controller to the ON state is received by the receiver, and the vehicle travels on the down gradient, without any preceding vehicle present in front of the vehicle, at a vehicle speed more than the upper limit.

7. A vehicle control method, comprising:
recognizing peripheral conditions around a vehicle,
controlling traveling of the vehicle comprising
    suppressing an acceleration caused by a down gradient when the vehicle travels on the down gradient,
    maintaining a predetermined distance from a preceding vehicle recognized by a peripheral condition recognizer to the vehicle, and
receiving at least one instruction to switch an operation of the suppressing the acceleration and the maintaining the predetermined distance to an ON state or an OFF state,
wherein the maintaining the predetermined distance is performed with a higher priority than the suppressing the acceleration, regardless of whether any preceding vehicle is present in front of the vehicle, in a case where at least one instruction to set the operation of both the suppressing the acceleration and the maintaining the predetermined distance to the ON state is received, and the vehicle travels on the down gradient.

* * * * *